United States Patent Office 3,580,933
Patented May 25, 1971

3,580,933
ANTHRAQUINONE DYES, THEIR PRODUCTION AND USE
Jacques Guenthard, Binningen, Basel-Land, Switzerland, assignor to Sandoz Ltd. (also known as Sandoz A.G.), Basel, Switzerland
No Drawing. Filed Aug. 18, 1967, Ser. No. 661,551
Int. Cl. C09b *1/30, 1/50*
U.S. Cl. 260—372
22 Claims

ABSTRACT OF THE DISCLOSURE

Anthraquinone dyes of the formula

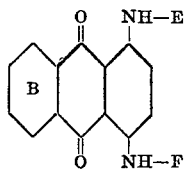

wherein:
E represents a sulfonated carboarylamido-alkylene group,
F represents E or an alkyl- or cycloalkyl radical, and the ring B may bear further substituents.

DESCRIPTION

This invention relates to anthraquinone dyes and to processes of their production. These dyes conform to the general formula

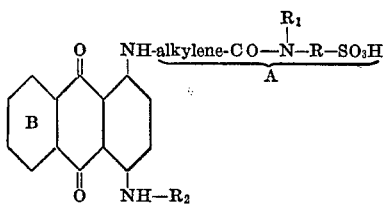

where R stands for an arylene radical which may be substituted, $R_1$ for hydrogen or an alkyl or cycloalkyl radical which may be substituted, and $R_2$ for the radical A or for an alkyl or cycloalkyl radical which may be substituted; and in which "alkylene" may be substituted and the ring B may bear further substituents.

One mode of operation of the process comprises the sulphonation of a compound of formula

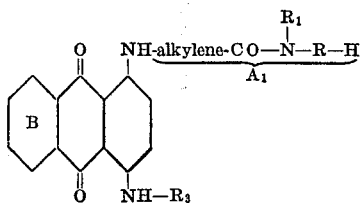

where $R_3$ has the significance of the radical $A_1$ or represents an alkyl or cycloalkyl radical which may be substituted. In each instance the alkyl or alkoxy radical bears 1 to 12, or preferably 1 to 6, carbon atoms.

A second mode of operation yielding the dyes of Formula I comprises reacting an anthraquinone compound of formula

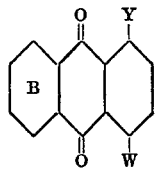

where Y represents a substituent which is exchangeable for an amino group and W represents Y or an —NH—$R_2$— group, or the leuco form of a compound of Formula III or a mixture of a compound of Formula III and its leuco form, with a compound of formula

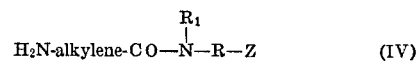

where Z stands for a hydrogen atom or the sulphonic acid group, after which the reaction product is oxidized if the leuco form of the compound of the Formula III has been used, and sulphonated if Z represents a hydrogen atom. The radical denoted with the word "alkylene" may have a straight chain or it may be branched or substituted, the cyclohexyl and phenyl radicals being examples of suitable substituents. This "alkylene" radical is preferably —$(CH_2)_n$— where $n$ represents a whole number from 1 to 8, or preferably from 1 to 6; examples are

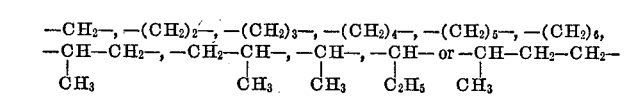

The arylene radical R generally represents a phenylene radical, but it may stand for a naphthylene or tetrahydronaphthylene radical. Besides the sulphonic acid group it may be substituted by further substituents, for example by a sulphonamide, alkyl- or arylsulphonyl group or an alkyl or alkoxy radical having 1 to 12 or preferably 1 to 6 carbon atoms, all of which groups and radicals may be substituted. The alkyl radicals may bear halogen atoms, e.g. chlorine or bromine atoms, hydroxyl ar cyano groups; a substituted alkyl radical may be e.g., chloromethyl, chloroethyl, hydroxymethyl, hydroxyethyl, cyanoethyl, etc. The arylene radical may also be substituted by halogen atoms, preferably chlorine or bromine, or by an optionally substituted amino group or by hydroxyl, phenyl, phenoxy, cyano, nitro, etc. $R_1$ may stand for hydrogen or for an alkyl radical which may be substituted, for example a methyl, ethyl, propyl, chloromethyl, chloroethyl, hydroxymethyl, hydroxyethyl, cyanoethyl or benzyl radical, etc.; alternatively, it may stand for an optionally substituted cycloalkyl radical, preferably a cyclohexyl radical, or for an alkyl-substituted cycloalkyl, e.g. a methylcyclohexyl radical. $R_2$ may represent the radical A or an optionally substituted alkyl or cycloalkyl radical, in which latter case the alkyl or cycloalkyl radical may have the same structure as the radical $R_1$.

The ring B may be substituted by halogen atoms, e.g. chlorine or bromine atoms, or by hydroxyl groups.

In Formula III Y stands for a substituent exchangeable for an amino group, e.g. for the hydroxyl group or an amino or alkoxy group having 1 to 4 or preferably 1 or 2 carbon atoms.

W has the same significance as Y or alternatively, represents an —NH—$R_2$— group.

Good dyes are obtained by sulphonating a compound of formula

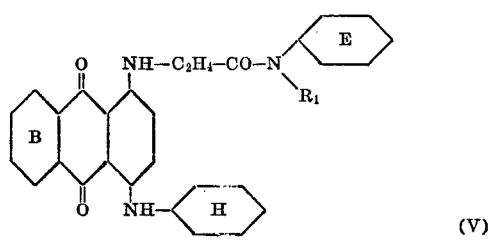

where the phenyl radical E may be further substituted.

Similarly good dyes are obtained when a compound of formula

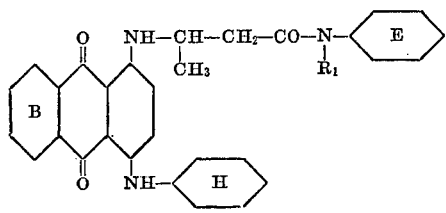
(VI)

or a compound of formula

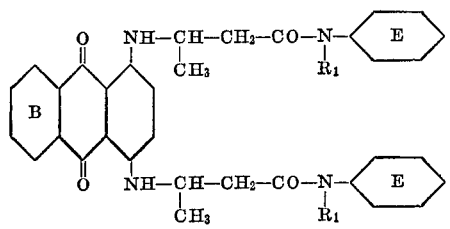
(VII)

is sulphonated. Sulphonation is best carried out in monohydric sulphuric acid or in 5 to 10% oleum or in chlorosulphonic acid in the temperature range of 0–40° C. or preferably 20–25° C.

It is of advantage to use an organic medium to react a compound of Formula III with a compound of Formula IV when Z in the latter compound represents a hydrogen atom. A compound of Formula IV or a mixture of compounds of this formula can be reacted with a compound of Formula III or its leuco derivative or with a mixture of compounds of Formula III or their leuco forms. The reaction products thus formed are oxidized and then sulphonated, as required.

The reaction of a compound of Formula IV, when Z stands for a sulphonic acid group, or of a mixture of compounds of this formula with a compound of Formula III or its leuco derivative or with a mixture of such compounds or their leuco forms is effected preferably in aqueous medium.

Examples of the organic media which may be used for reacting a compound of Formula IV with a compound of Formula III are alcohols of high molecular weight, such as butyl alcohol, iso-butyl alcohol, amyl alcohol, octyl alcohol, dodecyl alcohol, or nitrobenzene, chlorobenzene or mixtures of such solvents. The reaction is carried out at temperatures of 80–140° C. or preferably at 100–130° C.

The new dyes are used for the dyeing, pad dyeing or printing of fibres of animal origin, e.g. wool and silk, polyamide fibres, leather, natural cellulosic fibres, such as cotton and linen, regenerated cellulosic fibres, such as viscose and cuprammonium rayon, and of blends and other articles of these fibres. In the dyeing, padding and printing of these dyes, the commonly used wetting, levelling and thickening agents and other textile and leather auxiliary products can be employed.

The dyes can be applied from an acid or neutral medium at temperatures of 70–100° C., boiling temperature being preferred. On the aforenamed substrates they show good build-up power and excellent level dyeing properties.

The dyeings and prints obtained have very bright reddish to greenish blue shades and show very good light fastness, particularly on wool and polyamide fibres. They give excellent results on nylon materials of irregular affinity. They also have a good standard of fastness to wet tests, such as washing, milling, sea water, perspiration and soda boiling, and to rubbing and dry cleaning.

Polyamide fibre types which are dyeable with these dyes include the condensation proucts of 1,6-hexamethylenediamine and adipic or sebacic acid, the polymerisation products of ε-caprolactam and those of ω-aminoundecanoic acid, and copolymers, e.g. those of 1,6-hexamethylenediamine, adipic acid and ε-caprolactam.

A number of the compounds of Formula II can be produced from the analogous 1-amino-4-alkyl- or 4-cyclohexylamino-anthraquinones by the addition of unsaturated aliphatic carboxylic acids or their functional derivatives, such as acid nitriles or acid amides, e.g. acrylic, methacrylic or crotonic acid, or by condensation with halogenated aliphatic carboxylic acids or their lactones, e.g. halogenobutyric acid, halogenopropionic acid, halogenovaleric or halogeno-iso-valeric acid, halogenocaproic acid, halogenoenanthic acid, butyrolactone, valerolactone, caprolactone, etc., on or with the 1-amino group, followed by conversion into the arylamide compound by one of the known methods.

Other compounds of Formula II can be produced by reacting 1,4-dihydroxyanthraquinone with the appropriate amino acids, e.g. aminoacetic α- or β-aminopropionic, α-aminobutyric, α-amino-iso-butyric, aminovaleric, e.g. ω-aminovaleric, or aminocaproic acid, and converting the reaction product into the corresponding arylamide compound by one of the known methods.

Certain compounds of Formula II can be produced by reacting a compound of formula

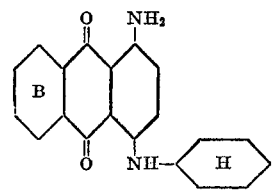
(VIII)

by the known methods with a halogenoacetic acid and reacting the resulting carboxymethylaminoanthraquinone or its functional derivative with an arylamine of formula

(IX)

U.S. Pat. 3,247,229 teaches the use of the dye of the formula

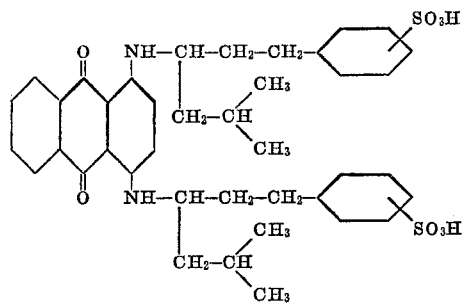
(a)

for the dyeing of polyamide fibres. It was surprising, that the dyes of Formula I have better build-up power on these fibres.

In the following examples the parts and percentages are by weight and the temperatures in degrees centigrade.

EXAMPLE 1

11.7 parts of 1-(2'-carbophenylamido)-ethylamino-4-cyclohexylaminoanthraquinone, prepared according to the particulars of French patent specification 1,470,597, are entered into 75 parts of monohydric sulphuric acid at 14–18°, after which 8 parts of weak oleum are added. The reaction mixture is stirred for 5 hours at 18–20° to yield a product which is run into a mixture of 150 parts of water and 50 parts of ice. It is filtered off, the filter residue washed with 10% aqueous sodium chloride solution, kneaded with lithium carbonate until a constant pH of 7.5 is reached and finally dried at 100°. This dye is applied to polyamide fibres from a weakly acid bath; it gives bright blue dyeings having excellent fastness to light and wet treatments. Polyamide materials of irregular affinity which normally tend to dye barry are dyed level.

EXAMPLE 2

6.7 parts of 1,4-di-(2'-carbophenylamido)ethylamino-anthraquinone, obtained according to the procedure of French patent specification 1,390,833, are entered at 12–16° into 50 parts of monohydric sulphuric acid. 4 parts of 25% oleum are added and the mixture is stirred for 5 hours at 20–25°, following which the reaction product is run into a mixture of 200 parts of ice and 100 parts of water and filtered off. The filter cake is washed with 20% aqueous sodium chloride solution, kneaded with sodium carbonate and dried at 100°. The dye builds up on wool and polyamide fibres from a weakly acid bath to give dyeings of bright reddish blue shade. Those on polyamide fibres are very fast to wet treatments and outstandingly light-fast. Heavy shades can be produced and material of irregular affinity is dyed level by the dye.

Dyeing Example A

A dyebath is prepared with 4000 parts of water, 4 parts of ammonium sulphonate and 4 parts of the dye of Example 1. It is raised to 40° and at this temperature 100 parts of a polyamide fabric are entered. Over the next 30 minutes the bath is raised to the boil and it is held at the boil for 30 minutes, when the water lost by evaporation is replaced and 2 parts of glacial acetic acid are added. This is followed by a final 30 minutes at the boil. On removal the fabric is rinsed cold and dried.

This dyeing procedure is applicable to wool, on which dyeings of similarly good fastness are obtained.

EXAMPLE 3

12 parts of 1-(2'-carbophenylamido) - α - methylethyl-amino-4-cyclohexylaminoanthraquinone are entered into 80 parts of monohydric sulphuric acid at 15–20°. After the addition of 8 parts of weak oleum the mixture is stirred for 3 hours at 20° and then run into a mixture of 150 parts of water and 50 parts of ice. The product is filtered off, the filter cake washed with 5% aqueous sodium chloride solution, kneaded with lithium hydroxide until a constant pH of 7.5 to 8 is obtained, and dried. Dyed from a weakly acid bath, this dye gives bright blue dyeings on wool and polyamide fibres.

The dyeings are fast to wet treatments and have high light fastness on wool and very high light fastness on polyamide fibres. The dye gives level dyeings on polyamide materials showing a tendency to barry dyeing.

EXAMPLE 4

At ambient temperature 16 parts of 1,4-dihydroxy-anthraquinone and 8 parts of the same compound in the leuco form are entered into 200 parts of normal-butanol, followed by 40 parts of 3-amino-3-methylpropionic acid phenylamide. The mixture is raised to 100–110° under a nitrogen atmosphere and 4 hours at this temperature are allowed for the reaction, after which the nitrogen is replaced by a jet of air in order to oxidize the leuco constituents. The dye settles out and is filtered off with suction, washed with methyl alcohol and water, and dried.

15 parts of the dye thus formed, 1,4-di-[1'-methyl-2'-(phenylaminocarbonyl) - ethylamino]-anthraquinone, are entered at 15–20° into 80 parts of monohydric sulphuric acid. 14 parts of weak oleum are added and the reaction mixture is then stirred for 3 hours at 20–25°, poured into a mixture of 150 parts of water and 50 parts of ice, and filtered. The dye left on the filter is washed with 10% aqueous sodium chloride solution, kneaded with sodium bicarbonate to a constant pH of 7.5 to 8, and dried. It dyes wool and polyamide fibres from weakly acid baths, giving bright blue dyeings which are fast to wet treatments and very fast to light. Irregular dyeing material is dyed level.

The amine employed in the reaction can be produced by one of the known methods, e.g. by aminolysis of the acetoacetylanilide or by hydration of the analogous 3-aminocrotonic acid phenylamide.

EXAMPLE 5

The 40 parts of the amine employed in Example 4 may be replaced by 45 parts of 3-amino-3-methyl-propionic acid-(2'-methoxy)-phenylamide and the procedure of Example 4 adopted, on which 1,4-di-[1'-methyl-2'-(2''-methoxyphenylaminocarbonyl)-ethylamino] - anthraquinone is obtained. This dye is sulphonated as described in Example 1. On wool it gives dyeings equally as fast to light as those of the dye of Example 4 and with very good wet fastness properties. The following table details the structural composition of further dyes which can be produced in accordance with the procedures described in Examples 1 to 5. They have the formula

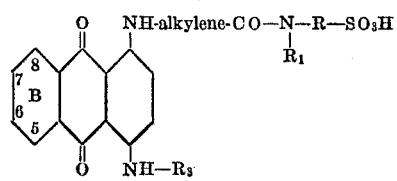

where "alkylene" B, R, $R_1$ and $R_3$ possess the meanings specified in the table.

TABLE
| Example Number | Position of the substituents in the ring B | Meaning of "alkylene" | R | $R_1$ | $R_2$ | Shade of dyeing on polyamide fibre or wool |
|---|---|---|---|---|---|---|
| 6 | | —$C_2H_4$— | 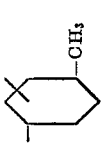 | H |  | Neutral blue. |
| 7 | | Same as above |  | H | Same as above | Id. |
| 8 | | do |  | I | do | Id. |
| 9 | | do |  | H | do | Id. |
| 10 | | do |  | H | do | Reddish blue. |
| 11 | | do |  | H | do | Neutral blue. |
| 12 | | do |  | —$CH_3$ | do | Reddish blue. |
| 13 | | do | Same as above | —$CH_2$— | do | Id. |
| 14 | | do | do | H |  | Neutral blue. |

TABLE—Continued

| Example Number | Position of the substituents in the ring B | Meaning of "alkylene" | R | R₁ | R₃ | Shade of dyeing on polyamide fibre or wool |
|---|---|---|---|---|---|---|
| 15 | 6,7-dichloro | do. | do. | H | ⬡—H | Greenish blue. |
| 16 | do. | do. | ⬡ (cyclohexyl) | H | ⬡(CH₃)—H | id. |
| 17 | do. | do. | Same as above | H | —CH₃ | Reddish blue. |
| 18 | do. | do. | ⬡(CH₃) | H | —C₂H₅ | id. |
| 19 | do. | do. | ⬡ | H | —CH₂CH₂OH | Reddish blue. |
| 20 | do. | do. | ⬡(CH₃) | —CH₃ | —CH₃ | id. |
| 21 | do. | do. | Same as above | —C₂H₅ | Same as above | id. |
| 22 | do. | —CH₂—CH(CH₃)— | do. | H | ⬡—H | Neutral blue. |
| 23 | do. | —CH₂—CH(CH₃)— | ⬡(CH₃) | H | —CH₃ | Reddish blue. |
| 24 | do. | —CH₂— | ⬡(CH₃) | H | ⬡—H | Neutral blue. |

TABLE—Continued
| Example Number | Position of the substituents in the ring B | Meaning of "alkylene" | R | $R_1$ | $R_2$ | Shade of dyeing on polyamide fibre or wool |
|---|---|---|---|---|---|---|
| 25 | | Same as above | | $-CH_3$ | Same as above | Id. |
| 26 | | do | | $-CH_3$ | $-CH_3$ | Reddish blue. |
| 27 | | $-C_2H_4-$ | | H |  | Red-blue. |
| 28 | | Same as above | | H |  | Id. |
| 29 | | do | | H | 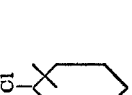 | Id. |
| 30 | | do | | H | 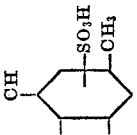 | Id. |

TABLE—Continued

| Example Number | Position of the substituents in the ring B | Meaning of "alkylene" | R | $R_1$ | $R_3$ | Shade of dyeing on polyamide fibre or wool |
|---|---|---|---|---|---|---|
| 31 | do | do | (phenyl) | $-CH_3$ | $-CH_2-CH_2-CO-N(CH_3)-$(phenyl)$-SO_3H$ | id. |
| 32 | do | $-CH_2-$ | Same as above | H | $-CH_2-CO-NH-$(phenyl)$-SO_3H$ | Red-blue. |
| 33 | do | Same as above | do | $-CH_3$ | $-CH_2-CO-N(CH_3)-$(phenyl)$-SO_3H$ | id. |
| 34 | do | do | do | $-CH_3$ | (phenyl)-H | id. |
| 35 | do | do | (phenyl)-$OCH_3$ | H | Same as above | Neutral blue. |
| 36 | do | $-C_2H_4-$ | (phenyl)-(n-$C_4H_9$) | H | do | id. |
| 37 | 5,8-dihydroxy | Same as above | (phenyl) | H | $-CH_2-CH_2-CO-NH-$(phenyl)$-SO_3H$ | Green-blue. |
| 38 | do | $-CH_2-CH(CH_3)-$ | Same as above | H | $CH_3-CH(-CH_2-)-CO-NH-$(phenyl)$-SO_3H$ | id. |

3,580,933

TABLE—Continued

| Example Number: | Position of the substituents in the ring B | Meaning of "alkylene" | R | R₁ | R₃ | Shade of dyeing on polyamide fibre or wool |
|---|---|---|---|---|---|---|
| 39 | 5-hydroxy | —C₂H₄— | do | H | —CH₂—CH₂—CO—NH—⟨ring-SO₃H⟩ | Greenish blue. |
| 40 | | —CH—CH₂—<br>　CH₃ | ⟨ring-Cl⟩ | H | ⟨ring-H⟩ | Neutral blue. |
| 41 | | Same as above | ⟨ring-Cl⟩ | H | —CH—CH₂—CO—NH—⟨ring-SO₃H, Cl⟩<br>　CH₃ | Reddish blue. |
| 42 | | —(CH₂)₃— | ⟨ring⟩ | H | —CH₃ | id. |
| 43 | | —(CH₂)₅— | Same as above | H | ⟨ring-SO₃H, H⟩ | Neutral blue. |
| 44 | | —CH—<br>　CH₃ | ⟨ring-OCH₃⟩ | H | —CH—CO—NH—⟨ring-SO₃H, OCH₃⟩<br>　CH₃ | Reddish blue. |
| 45 | | Same as above | ⟨ring⟩ | H | ⟨ring-H⟩ | Neutral blue. |
| 46 | | —CH—<br>　CH₂—CH₃ | Same as above | H | —CH—CO—NH—⟨ring-SO₃H⟩<br>　CH₂—CH₃ | Reddish Blue. |
| 47 | | —CH—<br>　CH₂—CH₃ | ⟨ring-Cl⟩ | H | ⟨ring-H⟩ | Neutral blue. |

TABLE—Continued

| Example Number | Position of the substituents in the ring B | Meaning of "alkylene" | R | $R_1$ | $R_3$ | Shade of dyeing on polyamide fibre or wool |
|---|---|---|---|---|---|---|
| 48 | | —$C_2H_4$— | [naphthyl] | H | Same as above | Blue. |
| 49 | | Same as above | [carbazole] | H | ...do... | id. |
| 50 | | —CH(CH$_3$)—CH$_2$— | [phenyl] | —CH$_3$ | —CH(CH$_3$)—CH$_2$—CO—N(CH$_3$)—[phenyl with SO$_3$H] | Neutral blue. |
| 51 | | Same as above | [phenyl with H$_3$CO, OCH$_3$] | H | —CH(CH$_3$)—CH$_2$—CO—NH—[phenyl with OCH$_3$, SO$_3$H, OCH$_3$] | Greenish blue. |
| 52 | | ...do... | [phenyl with H$_3$CO, Br, OCH$_3$] | H | —CH(CH$_3$)—CH$_2$—CO—NH—[phenyl with OCH$_3$, Br, SO$_3$H, OCH$_3$] | id. |
| 53 | | ...do... | [naphthyl + phenyl] | H | —CH(CH$_3$)—CH$_2$—CO—NH—[naphthyl with SO$_3$H] | id. |
| 54 | | —CH(CH$_3$)— | Same as above | H | —CH(CH$_3$)—CO—NH—[phenyl with SO$_3$H] | Reddish blue. |
| 55 | | —CH(C$_2$H$_5$)—CH$_2$— | ...do... | H | —CH(C$_2$H$_5$)—CH$_2$—CO—NH—[phenyl with SO$_3$H] | Neutral blue. |
| 56 | | —CH(C$_3$H$_7$)—CH$_2$— | ...do... | H | —CH(C$_3$H$_7$)—CH$_2$—CO—NH—[phenyl with SO$_3$H] | id. |
| 57 | | —CH(CH$_3$)— | ...do... | —CH$_3$ | —CH(CH$_3$)—CO—N(CH$_3$)—[phenyl with SO$_3$H] | Reddish blue. |

TABLE—Continued

| Example Number | Position of the substituents in the ring B | Meaning of "alkylene" | R | R₁ | R₃ | Shade of dyeing on polyamide fibre or wool |
|---|---|---|---|---|---|---|
| 58 | | $-\overset{CH_3}{\underset{}{CH}}-CH_2-$ | | H | ⬡–H | Neutral blue. |
| 59 | | Same as above | H₃C–O–⬡– | H | Same as above | id. |
| 60 | | $-\overset{CH_3}{\underset{}{CH}}-$ | ⬡– | —CH₃ | —do— | Reddish blue. |
| 61 | | $-\overset{CH_3}{\underset{}{CH}}-CH_2-$ | Same as above | H | —CH₃ | Neutral blue. |
| 62 | | Same as above | —do— | ⬡–H | —CH₃ | id. |

Formulae of representative dyes of the foregoing examples are as follows:

Example 1

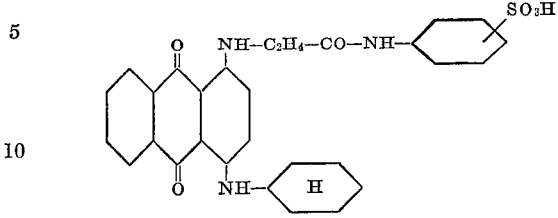

Example 2

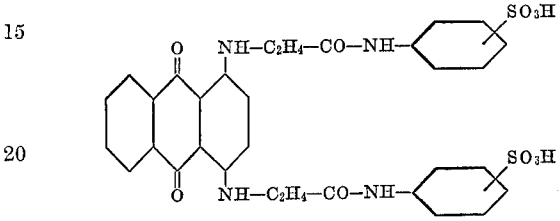

Example 3

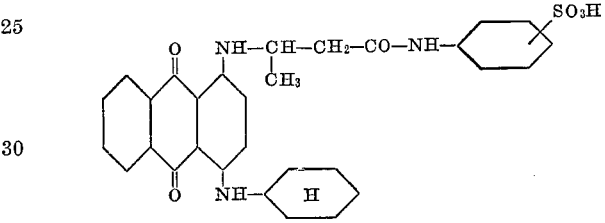

Example 4

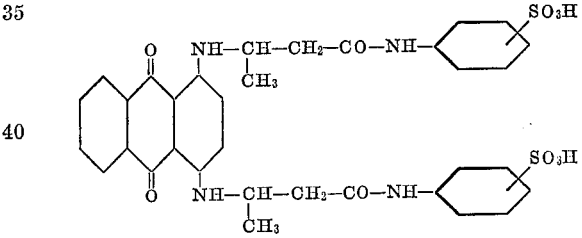

Example 5

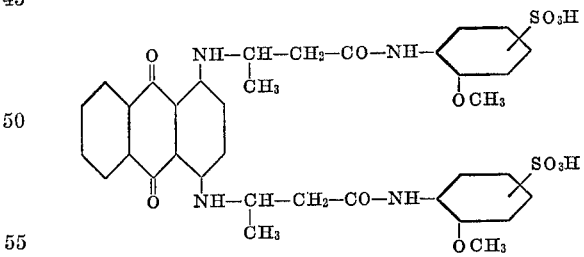

Having thus disclosed the invention, what I claim is:
1. Anthraquinone dye of the formula

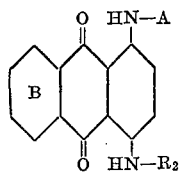

wherein:
A is alkylene—CO—N(R₁)—R—SO₃H;
alkylene has from 1 to 8 carbon atoms and is either unsubstituted or substituted, any substituent being a member selected from the group consisting of phenyl and cyclohexyl;
R is substituted or unsubstituted arylene; the arylene being a member selected from the group consisting of phenylene, naphthylene and tetrahydronaphthylene; any unspecified substituent on substituted arylene having up to 12 carbon atoms and being selected from the group consisting of a sulphonamide, alkylsulphonyl, arylsulphonyl, alkyl, alkoxy, halo, amino, hydroxy, phenyl, phenoxy, chlorophenoxy, cyano and nitro; each alkyl of which is either unsubstituted or substituted, any substituent on substituted alkyl being a member selected from the group consisting of chloro, bromo, hydroxy and cyano;

$R_1$ is a member selected from the group consisting of hydrogen, alkyl, substituted alkyl, cyclohexyl and methylcyclohexyl; each alkyl having from 1 to 3 carbon atoms and any substituent on substituted alkyl being a member selected from the group consisting of chloro, hydroxy, cyano and phenyl;

$R_2$ is A or a member selected from the group consisting of alkyl, substituted, alkyl, cyclohexyl and methylcyclohexyl; each alkyl having from 1 to 3 carbon atoms and any substituent on substituted alkyl being a member selected from the group consisting of chloro, hydroxy, cyano and phenyl;

Ring B is either unsubstituted or substituted, any substituent thereon being a member selected from the group consisting of halo and hydroxy.

2. Dye according to claim 1 wherein alkylene is a member selected from the group consisting of —$CH_2$—, —$(CH_2)_2$—, —$(CH_3)_3$—, —$(CH_2)_4$—, —$(CH_2)_5$—, —$(CH_2)_6$—, —$CH(CH_3)$—$CH_2$—,

—$CH_2$—$CH(CH_3)$—

—$CH(CH_3)$—, —$CH(C_2H_5)$— and

—$CH(CH_3)$—$CH_2$—$CH_2$—

3. Dye according to claim 1 wherein alkylene is a member selected from the group consisting of —$C_2H_4$— and —$CH(CH_3)$—$CH_2$—; R is substituted or unsubstituted phenylene; and $R_2$ is cyclohexyl.

4. Dye according to claim 1 wherein alkylene is

—$CH(CH_3)$—$CH_2$—

$R_2$ is A; and R is substituted or unsubstituted phenylene.

5. Dye according to claim 1 wherein alkylene is

—$C_2H_4$—

R is substituted or unsubstituted phenylene; and $R_2$ is cyclohexyl.

6. Dye according to claim 1 wherein alkylene is

—$CH(CH_3)$—$CH_2$—

R is substituted or unsubstituted phenylene; $R_2$ is cyclohexyl; and Ring B is unsubstituted.

7. Dye according to claim 2 wherein R is substituted or unsubstituted arylene, any unspecified substituent on substituted arylene being a member selected from the group consisting of alkyl having from 1 to 6 carbon atoms, alkoxy having from 1 to 6 carbon atoms, halo, phenyl, phenoxy and chlorophenoxy; $R_1$ is a member selected from the group consisting of hydrogen, alkyl, benzyl and cyclohexyl; and $R_2$ is a member consisting of alkyl, hydroxyalkyl, cyclohexyl and methylcyclohexyl.

8. Dye according to claim 2 wherein $R_2$ is A; the arylene of R is a member selected from the group consisting of phenylene and naphthylene, any substituent of substituted arylene being a member selected from the group consisting of alkyl having from 1 to 6 carbon atoms, alkoxy having from 1 to 6 carbon atoms, halo, phenyl and phenoxy; and $R_1$ is a member selected from the group consisting of hydrogen and alkyl.

9. Dye according to claim 3 wherein any substituent of substituted phenylene R is a member selected from the group consisting of alkyl having from 1 to 6 carbon atoms, alkoxy having from 1 to 6 carbon atoms, halo and phenyl.

10. Dye according to claim 4 wherein any substituent of substituted phenylene R is a member selected from the group consisting of alkyl having from 1 to 6 carbon atoms, alkoxy having from 1 to 6 carbon atoms halo, phenyl and phenoxy.

11. Dye according to claim 5 wherein any substituent of substituted phenylene R is a member selected from the group consisting of alkyl having from 1 to 6 carbon atoms, alkoxy having from 1 to 6 carbon atoms, halo and phenyl.

12. Dye according to claim 6 wherein any substituent of substituted phenylene R is a member selected from the group consisting of alkyl having from 1 to 6 carbon atoms, alkoxy having from 1 to 6 carbon atoms, halo and phenyl.

13. The anthroquinone dye according to claim 1 of the formula

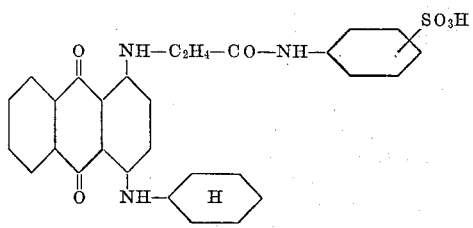

14. The anthraquinone dye according to claim 1 of the formula

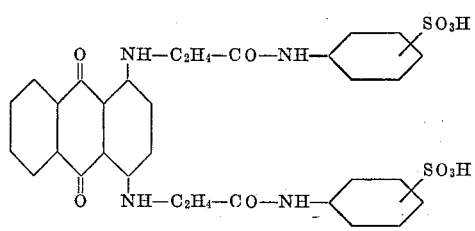

15. The anthraquinone dye according to claim 1 of the formula

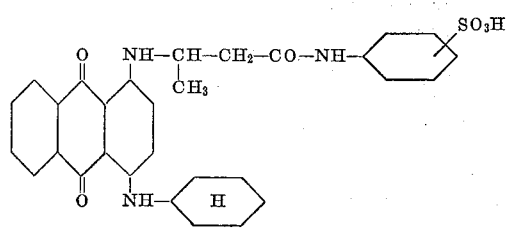

16. The anthraquinone dye according to claim 1 of the formula

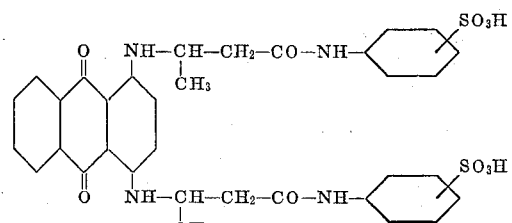

17. The anthraquinone dye according to claim 1 of the formula

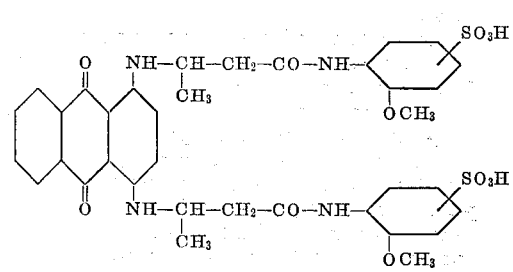

18. The anthraquinone dye according to claim 1 of the formula

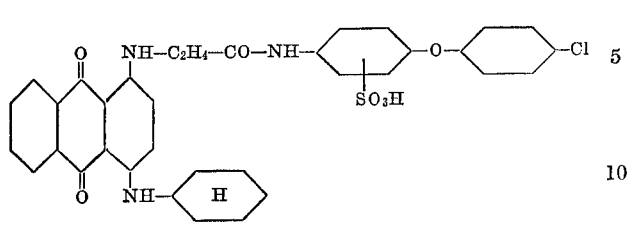

19. The anthraquinone dye according to claim 1 of the formula

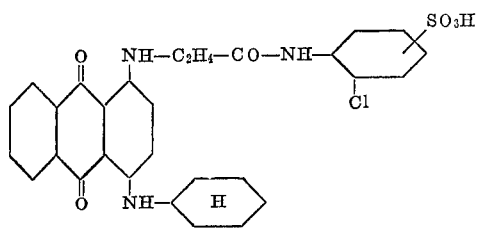

20. The anthraquinone dye according to claim 1 of the formula

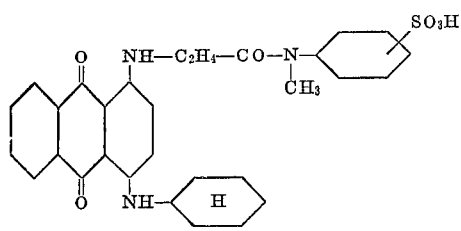

21. The anthraquinone dye according to claim 1 of the formula

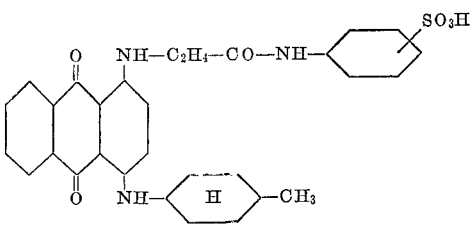

22. The anthraquinone dye according to claim 1 of the formula

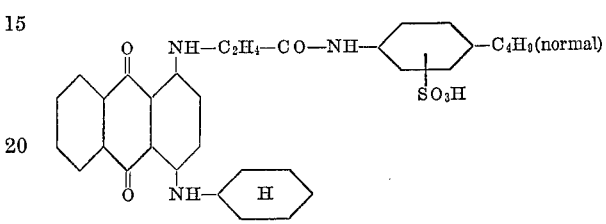

References Cited

UNITED STATES PATENTS 3,418,342  12/1968  Buecheler _____ 260—377

OTHER REFERENCES

Lubs: Synthetic Dyes and Pigments, pp. 393–397 (1955).

LEWIS GOTTS, Primary Examiner

E. J. SKELLY, Assistant Examiner

U.S. Cl. X.R.

8—12, 39, 40

UNITED STATES PATENT OFFICE
CERTIFICATE OF CORRECTION

Patent No. 3,580,933              Dated May 25th, 1971

Inventor(s) JACQUES GUENTHARD

It is certified that error appears in the above-identified patent and that said Letters Patent are hereby corrected as shown below:

Column 1, below line 7, insert "Claims priority, application Switzerland, Sept. 1, 1966, 12703/66; Sept. 28, 1966, 14076/66; Sept. 30, 1966, 14183/66; Jan. 19, 1967, 874/67; Feb. 6, 1967, 1730/67.". Column 2, line 24, "or -CH-" should read --or -CH- --; line 36, "e.g.," should read --, e.g.,--;
         |                              |
        CH$_3$                         CH$_3$ line 48, "cyclohexyl" should read --cyclohexyl ,--; line 58, "or" should read --or,--. Column 7, example 8, in the definition of R$_1$, "I" should read --H--. Column 11, example 28, in the definition of R$_3$, "CH" should read --CH$_3$--. Column 13, example 33, in the definition of R$_3$, "N—CH$_3$" should read --N—CH$_3$--. Column 15, example 40, in the definition of "alkylene", "-CH-" should read -- -CH- -- . Column 18, example 53, in the definition of R,
     |                    |
    CJ$_3$               CH$_3$ " [bicyclic structure] " should read -- [bicyclic structure] --; in the definition of R$_3$, " [bicyclic structure]—SO$_3$H " should read -- [bicyclic structure]—SO$_3$H --. Column 21, line 40, "-CH$_2$-" should read -- -CH$_2$-;--; line 44, "H$_4$-" should read --H$_4$-;--; line 49, "CH$_2$-" should read --CH$_2$-;--.

Signed and sealed this 9th day of April 1974.

(SEAL)
Attest:

EDWARD M. FLETCHER, JR.
Attesting Officer

C. MARSHALL DANN
Commissioner of Patents